March 21, 1950     A. G. GURRIES     2,501,328
VALVE UNIT

Filed Feb. 8, 1947     2 Sheets-Sheet 1

INVENTOR
A. G. Gurries

BY
ATTORNEYS

March 21, 1950

A. G. GURRIES 2,501,328

VALVE UNIT

Filed Feb. 8, 1947

INVENTOR
A. G. Gurries

BY
ATTORNEYS

Patented Mar. 21, 1950

2,501,328

UNITED STATES PATENT OFFICE 2,501,328

VALVE UNIT

Albert G. Gurries, Santa Clara, Calif.

Application February 8, 1947, Serial No. 727,399

1 Claim. (Cl. 277—57)

The present invention is directed to, and it is an object to provide a novel valve unit adapted for use in a fluid pressure system, especially hydraulic, as used for example, on certain earth working and construction equipment, wherein fluid pressure actuated power cylinders, included in the system and controlled by the valve unit, operate the working parts of such equipment.

Another object of the invention is to provide a control valve unit, for the purpose described, which is designed for ease and economy of manufacture and assembly; together with long operative life with a minimum of maintenance or repair.

A further object of the invention is to provide a valve unit, as above, which is of piston or sliding plug type; the plug valve being tubular and rotatably mounted on a control rod by means of which the plug valve is shifted axially to selective operative positions. The rotary mounting of the plug valve assures of uniform circumferential wear, as the valve is free to turn in the supporting bores as it is worked back and forth, and internal pressure loss in the valve unit is thus minimized. Non-rotary plug valves develop longitudinal wear lines or scores, which tend to permit leakage and reduce efficiency.

An additional object of the invention is to provide a valve unit, for a hydraulic pressure system, which includes a safety or pressure relief valve assembly of novel construction.

A further object of the invention is to provide a practical and convenient valve unit, and one which will be exceedingly effective for the purpose for which it is designed.

These objects are accomplished by means of such structure and relative arrangement of parts as will fully appear by a perusal of the following specification and claim.

Figure 1:
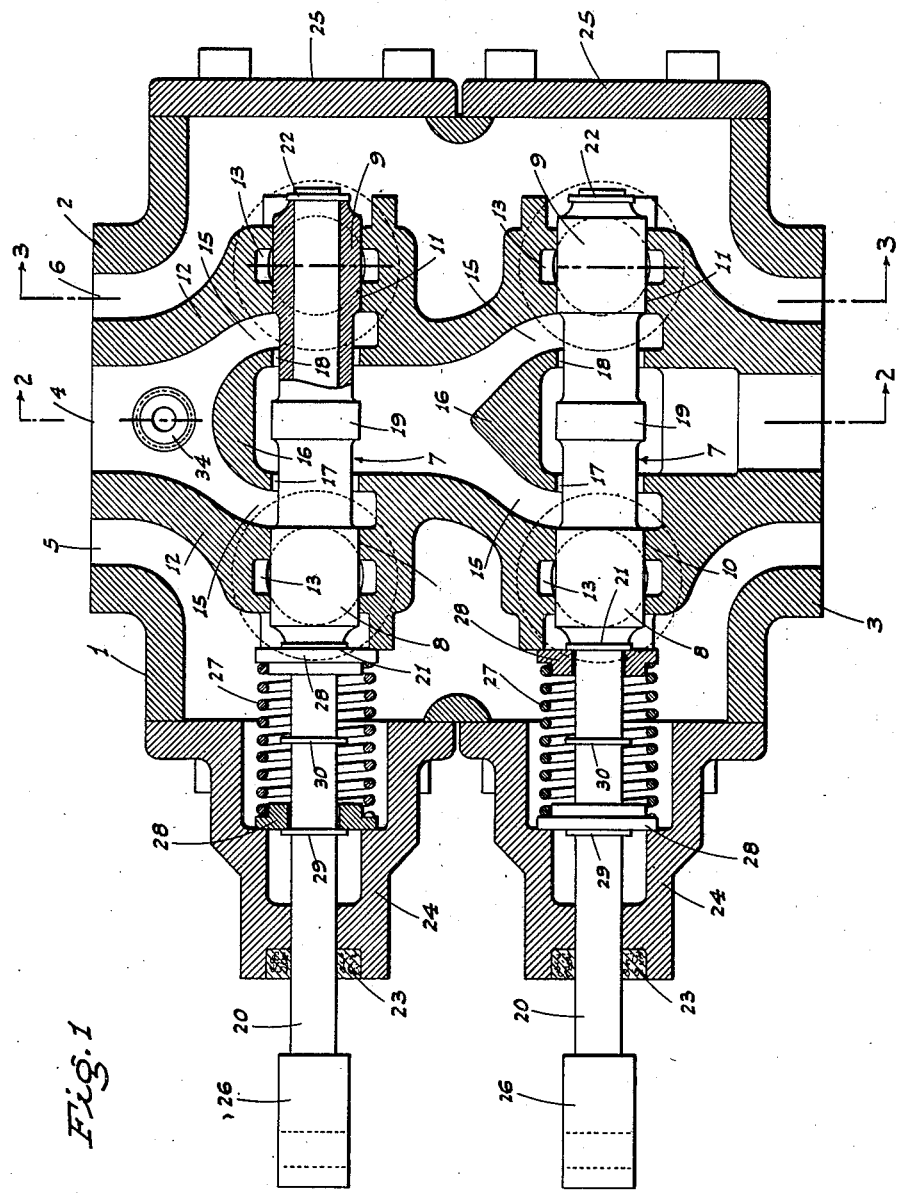
Fig. 1 is a sectional elevation of the invention as embodied in a dual valve assembly.
Figure 2:
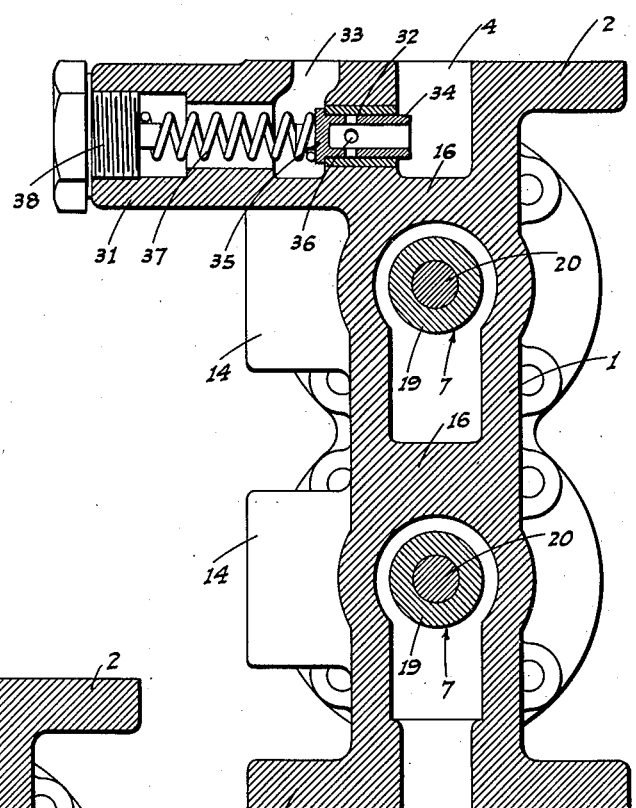
Fig. 2 is a cross section on line 2—2 of Fig. 1.
Figure 3:
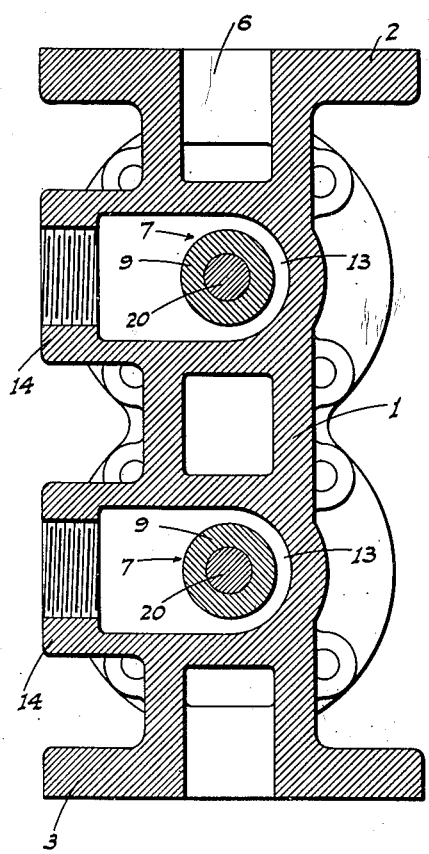
Fig. 3 is a cross section on line 3—3 of Fig. 1.

Referring now more particularly to the characters of reference on the drawings, the valve unit comprises a housing 1 formed, at opposite ends, with attachment flanges 2 and 3 by means of which the unit is interposed in the fluid pressure system; said housing including a central feed passage 4 extending therethrough from end to end and adapted to carry high pressure fluid from a source (not shown), the fluid entering said central passage 4 from the end adjacent flange 2.

On opposite sides of, and spaced from the central passage 4, the housing is formed with fluid return passages 5 and 6 which extend from end to end of said housing.

In the present embodiment the valve unit includes dual valve assemblies, as shown, and as these assemblies are duplicates; a description of one will suffice for both, particularly as each bears the same relationship to the passages 4, 5, and 6.

Each valve assembly comprises an elongated plug valve, indicated generally at 7, which extends transversely of the housing 1 and includes spaced, enlarged pistons 8 and 9 which slidably engage with a close fit in alined bores 10 and 11, respectively, in the partitions 12 between the central feed passage 4 and the fluid return passages 5 and 6.

Within each bore 10 and 11, the same is formed with a fluid receiving channel 13 which surrounds the corresponding piston 8 or 9 and communicates with a tapped, tubular boss 14 projecting laterally from the housing 1 on one face thereof; the bosses 14 being adapted to couple to the conduits (not shown) which lead to the fluid pressure actuated power cylinders of the implement. The pistons are of such axial extent and spacing that in the normal position of the plug valve 7, as in Fig. 1, said pistons close the channels 13.

Intermediate the partitions 12, and ahead of the plug valve 7, the feed passage forks into legs 15 separated from the following portion of said passage by transversely spaced partitions 16; the latter having ports 17 and 18 alined with the bores 10 and 11, through which the plug valve extends in normally clearance relation to permit of pressure flow in the passage 4 through said ports 17 and 18.

Between the ports 17 and 18 the plug valve 7 is formed with an enlarged, but relatively narrow closure collar 19 adapted to close with port 17 or 18 upon sliding of the valve 7 in a corresponding direction.

The plug valve 7 is tubular and a control rod 20 extends therethrough from end to end; the valve thus being rotative on the rod but held against relative axial displacement by retaining rings 21 and 22 at opposite ends of said valve. The rod 20 projects from the plug valve 7 across passage 5 and thence slidably extends through a packing gland 23 in a removable guide cap 24 on the housing. At the end opposite each cap 24, the housing includes a removable access plate 25. The free end of rod 20 is fitted with a connector 26 for connection with a manual control lever or the like.

The rod 20, and the plug valve 7 thereon, are yieldably maintained in a normal position with the latter closed, by a spring unit including a compression spring 27 carried by end collars 28 on rod 20 between ring 21, and another ring 29 fixed on the rod at the end of said spring opposite the plug valve. The collars bear on fixed parts of the adjacent partition 12 and cap 24. With this arrangement, the rod can be shifted in one direction or the other, but returns to normal position when released. A stop ring 30 on the rod between collars 28 limits movement of the rod 20, in either direction, to a predetermined distance.

Shifting of the rod 20 and attached plug valve 7 in one direction or the other causes one of the tapped bosses 14 to be placed in communication with the feed passage 4, and the other boss 14 to be placed in communication with the corresponding fluid return passage 5 or 6. This occurs for the reason that one of the pistons 8 or 9 shifts in a direction laterally away from passage 4 sufficient to permit of communication between the corresponding channel 13 and the adjacent leg 15 of said passage 4. At the same time, the ports 17 and 18 are closed by closure collar 19 and the inner end of the other of said pistons 8 or 9; said other piston then being shifted to a position to establish communication of its corresponding channel 13 and boss 14 with the adjacent fluid return passage 5 or 6. In this manner, one of the bosses 14 can be individually and selectively connected to the fluid pressure source, with the other boss 14 then automatically connected to the corresponding fluid return passage. This arrangement is useful, for example, for operating a double-acting power cylinder; opposite ends of the same being connected in communication with separate ones of the pair of bosses 14.

As the plug valve 7 is tubular and turnably mounted on the rod 20, said plug valve, as it is worked back and forth during normal operation of the valve unit, can rotate about said rod, which assures of even wear of the plug valve relative to the bores 10 and 11. By reason of this arrangement the plug valve 7 will not remain in any given rotative position, which might result in longitudinal wear lines or scoring, with resultant internal pressure leakage in the valve unit. Further, each valve assembly, as described provides for ease and economy of manufacture, together with facility of assembly.

Another feature of the invention resides in the particular form of relief valve, which comprises the following:

A tubular boss 31 projects from the same face of the housing 1 as the bosses 14, and in alinement with the intake end portion of the pressure fluid feed passage 4. A bore 32 extends from the forward passage 4, through the housing, into initial communication with the tubular boss; there being a lateral, relief or outlet passage 33 leading from the interior of the boss 31 adjacent its inner end.

A poppet relief valve is associated with the bore 32 and comprises a tubular stem 34 engaged in said bore with a close running fit, and formed, at its outer end, with an enlarged circular head 35, which serves as a stop to limit sliding movement of the stem 34 inwardly toward the passage 4. The stem 34 includes a laterally opening port 36 intermediate its ends, which port is normally closed by engagement of the stem 34 in the bore 32. A heavy-duty, normally substantially unloaded compression spring 37 engages between the head 35 and a closure 38 threaded into the outer end of the tubular box 31; said spring being held in place by locating pins, as shown. The spring 37 normally maintains the above described relief valve in closed position. However, upon occurrence of predetermined excessive pressure in the feed passage 4 the stem 34 is shifted by said pressure, against the spring 37, until the laterally opening port 36 communicates with the relief passage 33, whereupon the excessive pressure is relieved. After relief of the excessive pressure the spring 37 returns the relief valve to its normally closed position. In use of the valve the relief passage 33 is connected in communication, by suitable passage means, with the reservoir of the fluid pressure system.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a control valve for a fluid pressure system, which valve comprises a housing having separate fluid passages divided by a partition wall provided with a bore connecting the passageways, an outlet fitting formed on the housing and having a channel in communication with the bore, a plug valve normally closing the bore, said valve comprising a tubular member mounted with a sliding fit in the bore, a control rod mounted for longitudinal sliding movement through the side of the housing, said rod projecting through the tubular member, the latter being mounted axially immovable relative to but turnable on the rod, a pair of spaced apart collars loosely mounted on the rod, a compression spring interposed between the collars, one collar being normally held by the spring in contact with one end of the plug valve and the adjacent portion of the partition wall, the other collar being normally held by the spring in contact with an outer wall of the housing, and a stop ring fixed on the rod intermediate the collars and effective to limit the longitudinal movement of the rod in either direction through engagement with one or the other of said collars, respectively.

ALBERT G. GURRIES.

REFERENCES CITED

The following references are of record in the file of this patent:

UNITED STATES PATENTS

| Number | Name | Date |
|---|---|---|
| 1,643,753 | Slattery | Sept. 27, 1929 |
| 2,206,356 | Hutchings | July 2, 1940 |
| 2,214,799 | Sharp | Sept. 17, 1940 |
| 2,247,141 | Twyman | June 24, 1941 |